…

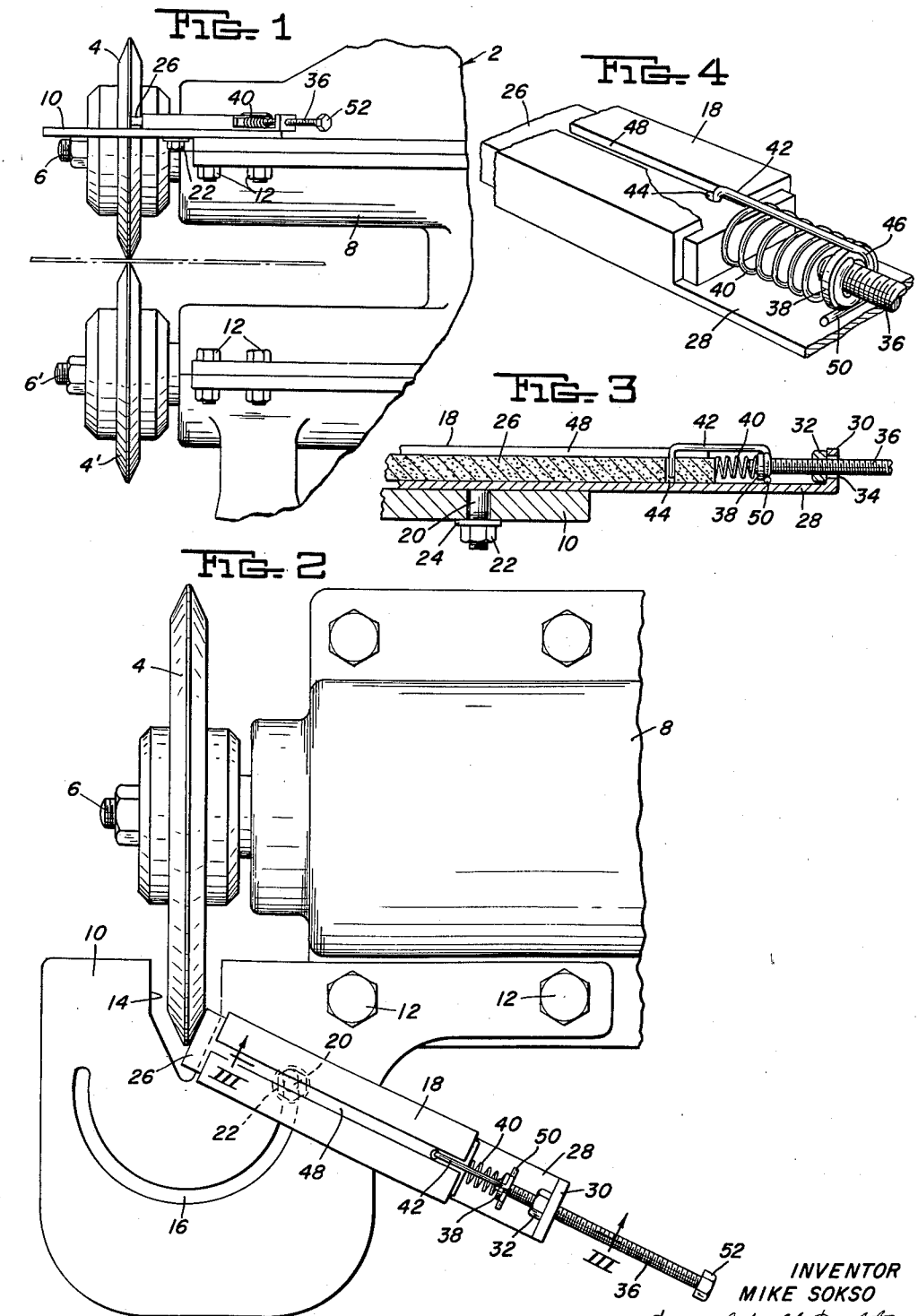

United States Patent Office 3,011,292
Patented Dec. 5, 1961

3,011,292
GRINDER ATTACHMENT FOR ROTARY SHEAR
Mike Sokso, Hammond and Wood Sts., Edgely, Pa.
Filed June 2, 1959, Ser. No. 817,526
3 Claims. (Cl. 51—250)

The present invention relates to apparatus for sharpening industrial knives and more particularly to improved apparatus for sharpening the circular knives of a rotary shear.

Prior to my invention when it was desired to sharpen the circular or disc knives of a rotary shear, it was necessary to remove the knives from the rotary shear and regrind their cutting edges in the machine shop or return them to the supplier for regrinding and sharpening. Under normal operating conditions of a steel bar mill, for example, the knives of the bar mill rotary shear become dull and nicked after approximately only two weeks of use and must then be removed for sharpening and sharp knives installed. Up to the time of my invention, a complete knife change required about six hours of mill down-time so that considerable tonnage was lost during each knife change. Also, each grinding of the knives reduced their diameters considerably so that the knives became too small to use after a relatively short useful life. This, of course, influenced production costs upwardly.

It is, accordingly, an object of the invention to provide an improved apparatus for sharpening the circular knives of a rotary shear which can be removably attached to the frame of the shear to sharpen the knives without removing them from the shear frame.

It is another object of the invention to provide apparatus of the character indicated which can be used to sharpen the dull cutting edge of the circular knife of a rotary shear and remove the nicks therefrom without reducing the diameter of the knife appreciably.

It is a further object of the invention to provide apparatus of the character indicated which can be used to sharpen the knives of a rotary shear in a mill line without the necessity of shutting down the mill line.

These and other objects will become more apparent after referring to the following specification and attached drawings, in which:

FIGURE 1 is a side elevational view of a rotary shear having the apparatus of the invention installed thereon;
FIGURE 2 is an enlarged plan view;
FIGURE 3 is a longitudinal sectional view taken along the line III—III of FIGURE 2; and
FIGURE 4 is a perspective view of a part of the apparatus of the invention.

Referring more particularly to the drawings reference numeral 2 designates a rotary shear on which the apparatus of the invention is adapted to be installed. Essentially, the shear 2 includes two opposed circular or disc knives 4 and 4' keyed to shafts 6 and 6', respectively, which are rotatably mounted in a housing 8. The shafts 6 and 6' are driven through a suitable gear arrangement (not shown) by an electric motor (not shown). The rotary shear thus far described is conventional in structure and function and is not claimed as part of the present invention but is shown only for the purpose of insuring a clear understanding of the invention which will now be described in detail.

The sharpening apparatus of the invention includes a bracket plate 10 which is adapted to be fastened to the housing 8 of the rotary shear 2 by bolts 12 or similar means, as best shown in FIGURE 2. The bracket plate 10 is notched as at 14 in such a manner that when the plate is bolted to the housing 8 one of the knives 4 or 4' passes through the notch depending upon which is to be sharpened as will become apparent. The bracket plate 10 is provided with a semi-circular slot 16 therethrough the purpose of which will become apparent as this description proceeds.

An elongated sleeve 18 having a stud 20 projecting from the bottom side thereof is mounted on the plate 10 with the stud extending through the slot 16. A nut 22 and a washer 24 may be provided on the end of the stud for fixing the sleeve in position.

The sleeve 18 is rectangular in cross-section and is positioned with one end adjacent the notch 14. A grinding stone 26, which may be made of Carborundum or similar material, is slidably telescoped in the sleeve with one end projecting over the notch 14. An extension 28 of the sleeve bottom projects beyond the end of the sleeve remote from the notch 14 and is provided with an upturned end 30 on the inner side of which a nut 32 is welded or otherwise rigidly affixed. The threaded bore of the nut communicates with an opening 34 through the upturned end. A threaded shaft 36 extends through the opening 34 and is threaded through the nut 32. A washer 38 is fixed on the bottom end of the shaft 36 to serve as a bearing for one end of a back-up spring 40. The other end of the spring bears against the end of the grinding stone 26.

The stone 26 is connected with the shaft 36 by means of a bent rod 42 which at one end fits into a suitable hole 44 in the stone. The other end of the rod 42 is formed into the shape of an eye 46 which fits around the shaft 36 above the washer 38. A longitudinal slot 48 extends along the upper side of the sleeve 18 to accommodate the rod 42 as stone 26 is slidably adjusted back and forth in the sleeve. A transverse pin 50 may be welded or otherwise rigidly attached to the eye 46 under the shaft 36 to prevent excessive twisting of the rod.

In operation, when the knife 4 requires sharpening, the bracket plate 10 is fastened to the housing 8 by means of bolts 12 and the sleeve 18 is adjusted in position at one end of the slot 16 and secured therein by tightening nut 22 on stud 20. After the sleeve has been thus positioned, shaft 36 is turned by means of a handle 52 on its end to compress spring 40 and move stone 26 into grinding position against one side of the cutting edge of knife 4. The rotary shear drive motor is then energized to rotate the knife 4 and sharpen one side of its cutting edge on the stone 26. Spring 40 accommodates for any out-of-roundness of the knife or play in the shaft 6 and thus prevents binding and damage to the knife or stone. After the first side of the cutting edge of the knife 4 has been sharpened, the rotary shear is stopped, the stone is retracted by turning the shaft 36, the nut 22 is loosened and the sleeve assembly is moved along slot 16 to its opposite end. There the sleeve assembly is adjusted in position with the projecting end of the stone 26 against the second side of the cutting edge of the knife 4. The rotary shear is then operated to rotate the knife 4 so that the second side of its cutting edge is sharpened by the stone 26.

When it is desired to sharpen knife 4', the bracket plate 10 and sleeve assembly are positioned on the housing 8 adjacent the knife 4' and the operation described above is repeated.

Use of the apparatus of the invention considerably reduces the time and cost of sharpening rotary shear knives and also eliminates the need of maintaining a large inventory of shear knives. The useful life of each knife is also prolonged since it is not necessary to grind off very much of the cutting edge of the knife each time it is sharpened by the apparatus of the invention. Further, if the cutting edge of a knife of a rotary shear is damaged during operation of the mill line of which the rotary shear is a part, the bracket plate and sleeve assembly of the invention can be installed on the shear housing and the knife sharpened while the mill line continues to operate.

While one embodiment of my invention has been shown and described, it will be apparent that other adaptations and modifications may be made without departing from the scope of the following claims.

I claim:

1. Apparatus for sharpening the knife of a rotary shear rotatably mounted on a shear frame which comprises a bracket plate detachably mounted on said frame adjacent said knife, said bracket having a substantially semi-circular slot therethrough having its center in the central radial plane of said shear knife, an elongated sleeve mounted on said bracket with one end adjacent the cutting edge of said knife, a projection depending from the underside of said sleeve and extending through said slot, said projection being slidable along said slot whereby said sleeve is movable from a first position wherein said one end is disposed adjacent one side of the cutting edge of said knife to a second position wherein said one end is disposed adjacent the opposite side of the cutting edge of said knife, means connected with said projection for locking said sleeve in position, a grinding stone slidably telescoped in said sleeve with one end thereof projecting from said one end of said sleeve, and means attached to said sleeve and engaging said stone for moving the latter toward and away from said one end of said sleeve.

2. Apparatus for sharpening the circular knife of a rotary shear as defined by claim 1 in which said means for moving said grinding stone includes a screw shaft and a spring back-up between said shaft and said stone.

3. Apparatus for sharpening the circular knife of a rotary shear as defined by claim 1 in which said slot is of such length that the projecting end of said grinding stone is in proper grinding position relative to said one side of the cutting edge of said knife when said depending projection is abutting one end of said slot and in proper grinding position relative to said opposite side of the cutting edge of said knife when said depending projection is abutting the opposite end of said slot.

References Cited in the file of this patent

UNITED STATES PATENTS

| | | |
|---|---|---|
| 841,541 | Kramer | Jan. 15, 1907 |
| 1,047,814 | Johansen | Dec. 17, 1912 |
| 1,834,034 | Norton | Dec. 1, 1931 |
| 1,888,285 | Muir | Nov. 22, 1932 |
| 2,364,160 | Neal | Dec. 5, 1944 |
| 2,377,984 | Ward | June 12, 1945 |